US010113671B2

(12) United States Patent
Franosch et al.

(10) Patent No.: US 10,113,671 B2
(45) Date of Patent: Oct. 30, 2018

(54) PROCESS FOR THE PRODUCTION OF A PIPE LINED WITH AN INLINER

(71) Applicants: Juergen Franosch, Marl (DE); Jan Berger, Dortmund (DE); Andreas Dowe, Borken (DE); Marco Gensheimer, Duisburg (DE); Uwe Kannengiesser, Duisburg (DE)

(72) Inventors: Juergen Franosch, Marl (DE); Jan Berger, Dortmund (DE); Andreas Dowe, Borken (DE); Marco Gensheimer, Duisburg (DE); Uwe Kannengiesser, Duisburg (DE)

(73) Assignee: EVONIK DEGUSSA GmbH, Essen (DE)

( * ) Notice: Subject to any disclaimer, the term of this patent is extended or adjusted under 35 U.S.C. 154(b) by 631 days.

(21) Appl. No.: 14/224,807

(22) Filed: Mar. 25, 2014

(65) Prior Publication Data

US 2014/0291032 A1 Oct. 2, 2014

(30) Foreign Application Priority Data

Mar. 28, 2013 (DE) ........................ 10 2013 205 614

(51) Int. Cl.
| F16L 9/00 | (2006.01) |
| F16L 57/00 | (2006.01) |
| F16L 58/00 | (2006.01) |
| B29C 63/00 | (2006.01) |
| F16L 9/14 | (2006.01) |
| B29C 63/34 | (2006.01) |
| F16L 9/19 | (2006.01) |
| F16L 57/06 | (2006.01) |
| F16L 58/10 | (2006.01) |
| F16L 9/147 | (2006.01) |
| E21B 17/00 | (2006.01) |

(52) U.S. Cl.
CPC ............... *F16L 9/14* (2013.01); *B29C 63/34* (2013.01); *F16L 9/147* (2013.01); *F16L 9/20* (2013.01); *F16L 57/06* (2013.01); *F16L 58/1036* (2013.01); *E21B 17/00* (2013.01); *Y10T 137/0318* (2015.04)

(58) Field of Classification Search
CPC ....... F16L 9/00; F16L 9/10; F16L 9/14; F16L 9/147; F16L 9/20; F16L 57/00; F16L 57/06; F16L 58/00; F16L 58/10; F16L 58/103; F16L 58/1036; B29C 63/00; B29C 63/30; B29C 63/34
See application file for complete search history.

(56) References Cited

U.S. PATENT DOCUMENTS

| 4,170,248 A | 10/1979 | Bennett et al. |
| 5,725,328 A | 3/1998 | Schmager |
| 5,762,450 A | 6/1998 | Schmager |
| 6,302,983 B1* | 10/2001 | Agren .................. B29C 57/02 |
| | | 156/273.7 |
| 8,574,697 B2 | 11/2013 | Dowe et al. |
| 8,679,270 B2 | 3/2014 | Dowe et al. |
| 8,726,588 B2* | 5/2014 | Jakus ................... B65D 90/36 |
| | | 220/89.2 |
| 2004/0036202 A1* | 2/2004 | Weatherby .......... B29C 63/0069 |
| | | 264/512 |
| 2007/0089797 A1* | 4/2007 | Farnsworth ............... B32B 1/08 |
| | | 138/98 |
| 2010/0009106 A1* | 1/2010 | Dowe .................... C08G 69/26 |
| | | 428/36.91 |
| 2011/0165358 A1 | 7/2011 | Dowe et al. |
| 2011/0209768 A1 | 9/2011 | Dowe et al. |
| 2012/0199317 A1 | 8/2012 | Hartmann et al. |
| 2012/0275774 A1 | 11/2012 | Goering et al. |
| 2012/0279577 A1 | 11/2012 | Goering et al. |
| 2013/0025734 A1 | 1/2013 | Kuhmann et al. |
| 2013/0025735 A1 | 1/2013 | Kuhmann et al. |
| 2013/0032239 A1 | 2/2013 | Kuhmann et al. |
| 2013/0032240 A1 | 2/2013 | Kuhmann et al. |
| 2013/0171388 A1 | 7/2013 | Pawlik et al. |

FOREIGN PATENT DOCUMENTS

| DE | 27 04 438 | 8/1977 |
| EP | 0 377 486 A2 | 7/1990 |
| EP | 0 450 975 A2 | 10/1991 |
| EP | 0 514 142 A2 | 11/1992 |
| EP | 0 562 706 A2 | 9/1993 |
| EP | 0 619 451 A1 | 10/1994 |
| JP | 52-93484 A | 8/1977 |
| JP | 2001-58353 A | 3/2001 |
| JP | 2001-310387 A | 11/2001 |
| JP | 2003-245974 A | 9/2003 |
| JP | 2004-512176 A | 4/2004 |
| WO | WO 93/21398 | 10/1993 |
| WO | WO 93/21399 | 10/1993 |
| WO | WO 95/27168 | 10/1995 |
| WO | WO 96/06298 | 2/1996 |
| WO | WO 96/37725 | 11/1996 |

(Continued)

*Primary Examiner* — Jacob T Minskey
*Assistant Examiner* — Matthew Hoover
(74) *Attorney, Agent, or Firm* — Oblon, McClelland, Maier & Neustadt, L.L.P.

(57) ABSTRACT

A process for the production of a pipe comprising: an interior surface having a shape; and a thermoplastic inliner is provided. The process comprises: introducing the thermoplastic inliner into the interior of the pipe; heating the pipe from the outside to a temperature higher than a crystallite melting point ($T_m$) of a molding composition of an exterior surface of the inliner; expanding the inliner radially in the pipe so that an exterior surface of the inliner assumes the shape of the interior surface of the pipe; and cooling the inliner; wherein a cross section of the inliner is optionally reduced through exposure to an exterior force prior to being introduced into the pipe. Relative movements between carrier pipe and inliner are thus prevented; the risk of collapse of the inliner is moreover low. The pipe is used for the production of a laid pipeline.

7 Claims, No Drawings

(56) References Cited

FOREIGN PATENT DOCUMENTS

| | | |
|---|---|---|
| WO | WO 97/25567 A1 | 7/1997 |
| WO | WO 98/02293 | 1/1998 |
| WO | WO 01/16520 A1 | 3/2001 |
| WO | WO 02/25156 A2 | 3/2002 |
| WO | WO 02/25156 A3 | 3/2002 |
| WO | WO 2007/023253 A1 | 3/2007 |
| WO | WO 2008/019946 A1 | 2/2008 |
| WO | WO 2011/042732 A1 | 4/2011 |

\* cited by examiner

PROCESS FOR THE PRODUCTION OF A PIPE LINED WITH AN INLINER

CROSS REFERENCE TO RELATED APPLICATIONS

This application claims priority to German Application No. 102013205614.1, filed Mar. 28, 2013, the disclosure of which is incorporated herein by reference in its entirety.

BACKGROUND OF THE INVENTION

The invention relates to a process for the production of a pipe, the interior surface of which has been lined with a thermoplastic layer. It also relates to the pipe thus produced, to use thereof for the production of a laid pipeline, and to the pipeline thus produced. The pipeline is in particular a metal pipeline which serves for the transport of wastewater, of gas, of crude oil or other oil, of refinery products, of water-oil mixtures, of sand-water-oil mixtures or of slurries in the mining sector or of similar fluids, or for the support and lining of an oil- or gas-production well or as drilling column during borehole construction in oil fields or gas fields.

Wastewater pipelines, oil pipelines or gas pipelines, or pipelines which transport similar fluids, have a limited operating time. The cause of this is firstly progressive corrosion damage and secondly the continuous mechanical stresses that arise during the transport of abrasive fluids. The pipelines concerned are generally at a depth of about 1 m or more on land or under water in oceans and other large bodies of water, i.e. in locations where replacement of the pipelines would be possible only at considerable cost. Metallic pipelines are often also used for stabilization and lining of boreholes in oil fields and gas fields. These pipelines, known by persons skilled in the art as casings, likewise have exposure to conditions that are highly corrosive, and also sometimes abrasive. Metallic pipelines are moreover also often used as drilling columns during borehole construction on land. These boreholes serve to provide access to sources of oil, of gas or of water. The drilling column guides the drill head during drilling. The column here is often a pipe with a cross section that permits passage of process fluids, and also of the first recovery fluids. Again, these pipelines have exposure to fluids that are highly corrosive and sometimes abrasive. There is therefore a need for pipelines that are resistant to corrosion and to abrasion.

The pipelines concerned are often equipped with a liner at the factory or for example on what are known as spool bases. The liner serves inter alia for protection from damage by corrosion. Oil-conveying pipelines are for example assembled on land prior to insertion into the ocean on what are known as spool bases, and equipped with a liner. Pipelines for casings of boreholes are provided with a liner at the factory and then inserted into the borehole.

DE 27 04 438 A1 proposes that a flexible polyethylene pipeline is inserted into the interior of outflow pipes and that the external diameter thereof is smaller than the internal diameter of the outflow pipe, where the flexible pipeline is arranged with separation from the outflow pipe, with formation of an annular space. In this process, the annular space is filled with a low-viscosity hardenable casting composition, For example magnesium cement is used as fill composition for the annular space. WO 2008/019946 describes a similar procedure.

WO 93/21398 and WO 93/21399 disclose lining systems with respectively two polyethylene inliners. The interior inliner has elevations which serve as spacers.

WO 96/06298 moreover teaches that a polyethylene or polypropylene inliner can be inserted into pipelines and, respectively, pipes provided with spacers and that the intervening space can then be filled with a hardenable composition or with a plastics material that hardens. A primer is recommended in order to improve the adhesion of this plastics material and the inliner.

Suitable processes for the insertion of an overdimensioned inliner into a pipe or a pipeline are described in Patent Applications: EP 0 562 706 A2, EP 0 619 451 A1, WO 95/27168, WO 98/02293, WO 01/16520, WO 2007/023253, EP 0 377 486 A2, EP 0 450 975 A2, EP 0 514 142 A2 and WO 96/37725.

According to these references the external diameter of the pipe inliner is designed to be somewhat larger than that of the pipe to be lined. In order to insert the inliner, the cross section thereof is then reduced by stretching, compression or folding. After the insertion of the inliner, recovery forces cause the inliner to come into contact with the internal wall of the pipe. This process can be assisted by application of pressure and heat. The pipe thus lined has no annular space. However, microscopic cavities remain, due to irregularities of the interior surface of the pipe or of the pipeline, present for example because of surface roughness, or else because of welds.

An example of a suitable insertion process is Swagelining™. In this process, once inliner pipes have been butt-welded to give a section that is somewhat longer than the carrier-pipe section to be renovated, the inliner section is drawn through a swage which temporarily reduces the diameter of the pipe. This therefore allows the inliner to be pulled into the smaller space within the carrier pipe. Once all of the inliner has been pulled into the pipeline, the tensile force is removed. By virtue of the recovery behaviour of the thermoplastic material, the inliner strives to regain its initial diameter, until it is in firm contact with the internal wall of the pipeline. This gives high wall friction between inliner and pipeline, leading to positional stabilization of the inliner and preventing longitudinal expansion induced by fluid-swelling or by the effect of heat, in excess of the expansion of the pipeline. The contact between the inliner and the internal surface of the pipe is moreover so tight that the resultant volume within the annular space is very small.

Another conventionally known insertion process is the Rolldown® process. Here again, inliner pipes are first bonded in situ by the butt-welding process. In order to permit insertion, the cross section of the inliner is reduced in the Rolldown machine with the aid of rollers arranged in pairs. The velocity of the deformation process is typically from one to three meters per minute. After insertion, the pipe ends are sealed and water pressure is applied to the inliner. This causes it to expand again to its original diameter and to establish tight contact with the internal wall of the pipe. In comparison with Swagelining, tensile forces required during the insertion of the inliner are smaller, thus reducing the stress to which the material is exposed and permitting higher insertion velocities.

These methods can also be used for insertion of the inliner at the factory.

EP 0 377 486 A2 describes the folding process.

WO 2011/042732 describes another process for the insertion of inliners with diameter greater than, or identical with, that of the carrier pipeline, wherein an inliner can be inserted into short pipe sections. According to this method the inliner is inserted into the carrier pipe through a swage.

The insertion processes described above are suitable for use of liners made of thermoplastic materials, to line pipes which serve for the transport of heating mediums, of fresh water, of wastewater, of gas, of crude or other oil, or of similar fluids, for the support and lining of oil- and gas-production wells, or as drilling columns during borehole construction in oil fields and gas fields.

All of the conventional processes described have the disadvantage that gases can permeate through the inliner. Gas therefore enters into the cavities and/or microcavities located between the inliner and the carrier pipeline. The gas pressure of the cavities is in equilibrium with the partial pressure of the gas in the conveyed fluid. In the event of pressure variations in the line, the gas located in the annular space can expand and in the worst case, the gas can assume a volume which can lead to radial contact between parts of the interior layer of the liner. This leads to blockage of the cross section of the pipe and, in the worst case, prevents any further passage of the fluid conveyed. This type of failure is known to the person skilled in the art as collapse and is the predominant type of failure of inliners. These pipes are in particular used for the conveying or transport of crude oil or natural gas or for the transport of supercritical $CO_2$ especially under conditions where relatively rapid pressure changes are likely to occur. Pressure changes of this type are a phenomenon known in the oil and gas industry as "Rapid Gas Decompression" (RGD).

Methods of handling such pressure changes are therefore required in tertiary mineral oil production. Tertiary oil production uses supercritical $CO_2$ as solvent for residual oil, reducing its viscosity and facilitating extraction from the oil-bearing strata. The critical temperature for $CO_2$ is 31° C., the critical pressure being 73.8 bar. In practice, markedly higher pressures are used, since the solvent power of supercritical $CO_2$ increases with pressure. Typical pressures are in the range from 75 to 220 bar, and the temperature associated with these pressures can be up to 150° C.

The pipes which transport supercritical $CO_2$ often have a polymeric inliner in order to protect the usually metallic structure from corrosion. In the case of transport pipes, the liner is usually composed of polyethylene; however, it may also be composed of polyamide or of PVDF.

Rapid pressure changes may moreover occur during the operation of crude-oil pipelines and gas pipelines when the line is depressurized for maintenance operations and pressured operations, with a sudden pressure decrease. A sudden pressure decrease can also occur in such conveying pipelines, collection pipelines or transport pipelines in the event of an emergency shutdown.

The object of the invention consists in avoiding the disadvantages described and providing a process for producing a lined pipe which firstly comprises the good characteristics of the liner technologies conventionally used and secondly eliminates cavities and microcavities, so that the difficulty described above no longer arises.

SUMMARY OF THE INVENTION

This and other objects have been achieved according to the present invention, the first embodiment of which includes a process for the production of a pipe, the pipe comprising: a carrier pipe having an interior surface having a shape; and a thermoplastic inliner; the process comprising: introducing the thermoplastic inliner into the interior of the carrier pipe; heating the carrier pipe from the outside to a temperature higher than a crystallite melting point ($T_m$) of a moulding composition of an exterior surface of the inliner; expanding the inliner radially in the carrier pipe so that an exterior surface of the inliner assumes the shape of the interior surface of the carrier pipe; and cooling the inliner; wherein a cross section of the inliner is optionally reduced through exposure to an exterior force prior to being introduced into the pipe.

In other embodiments, the present invention includes a pipe obtained according to the process and a pipeline produced with the pipe.

DETAILED DESCRIPTION OF THE PREFERRED EMBODIMENTS

Throughout this description all ranges described include all values and sub-ranges therein, unless otherwise specified. Additionally, the indefinite article "a" or "an" carries the meaning of "one or more" throughout the description, unless otherwise specified.

The process according to the present invention comprises the following operations:

a) a pipe is provided; this is also termed carrier pipe hereinafter,
b) an inliner made of a thermoplastic material is provided,
c) the cross section of the inliner is optionally reduced through exposure to an exterior force,
d) the inliner is introduced into the pipe,
e) the pipe is heated from outside to a temperature which is higher than the crystallite melting point $T_m$ of the moulding composition of the exterior surface of the inliner, while or after the inliner introduced is expanded radially, so that its exterior surface assumes the internal shape of the pipe,
f) the inliner is cooled and thus fixed.

The radial expansion of the inliner in e) is brought about by exposure to heat from outside during the heating of the carrier pipe, and also optionally supportive heating of the inliner from inside and/or application of an internal pressure.

There are generally two possible embodiments of the process.

In one embodiment, the external diameter of the inliner may be slightly greater than the internal diameter of the pipe. The difference between the two diameters is at least an infinitesimally small value. The external diameter of the inliner is typically greater than the internal diameter of the pipe by at most 25% and preferably 20%. Here, the cross section of the inliner is generally reduced in step c) by from 3 to 30% and preferably by from 5 to 25%. This may be achieved by stretching, compression or folding according to conventionally known methods as previously described.

In another embodiment, the external diameter of the inliner corresponds to the internal diameter of the pipe or is slightly smaller, for example up to at most 3%, and small forces may therefore be used to insert the inliner into the pipe ("close fit design"). The cross section of the inliner may be reduced by exposure to an exterior force prior to insertion thereof; however, this force may be markedly smaller than in the previous embodiment. The respective pipe geometries may be selected in such a way that the radial thermal expansion of the polymeric inliner during exposure to heat is greater than that of the pipe, and that the inliner enters into close contact to the pipe when exposed to heat, and the necessary contact pressure is generated. The latter can be reinforced by application of an internal pressure, for example by compressed air; this method may also be used to achieve the geometric fixing in operation f). However, the polymeric inliner may also be equipped, directly after the extrusion process, with a memory effect which leads to an enlarged external diameter after the exposure to heat and the subsequent cooling. To this end, the polymeric inliner is, in a subsequent process operation, drawn through a die and thus subjected to cold-forming (stretched longitudinally and reduced in diameter). This forming process is carried out at temperatures below $T_g$, in such a way that the stretching is reversed when the inliner is heated above $T_g$. This process may be particularly suitable for polymeric materials which have high $T_g$, for example for polyarylene ether ketones, the aim here being to ensure that these polymeric liners thus pretreated have good stability in storage.

The term "pipe" is used herein in the narrower sense to mean a transportable section; a plurality of these pipes are assembled to give a pipeline. This process is particularly suitable for pipe lengths of from 1 m to 50 m, these then being bonded during installation to give longer pipelines, for example by screw threads, flanges, compression sleeves, welds, etc.

The pipe may be preferably composed of metal, for example of stainless steel, of galvanized steel, of cadmium-plated steel, of steel coated with metal alloys, an example being GALFAN, or of other types of steel, of copper, of aluminium, of cast iron, of aluminium-coated metal, or of any other metal. It may be particularly preferable that the interior surface of the pipe is composed of steel, of zinc or of an alloy with the main constituent aluminium, iron or zinc.

Suitable materials for the inliner are thermoplastic moulding compositions, for example based on polyamides, on polyolefins, on fluoropolymers, or on polyarylene ether ketones or polyphenylene sulphide.

The polyamide that may be used according to the invention may be produced from a combination of diamine and dicarboxylic acid, from an ω-aminocarboxylic acid or from the corresponding lactam. In principle, any polyamide may be used, for example PA46, PA6, PA66 or copolyamides on this basis with units deriving from terephthalic acid and/or from isophthalic acid. In one preferred embodiment, the monomer units comprise on average at least 8, at least 9 or at least 10 C atoms. In mixtures of lactams it is the arithmetic average that is considered. In the case of a combination of diamine and dicarboxylic acid, the arithmetic average of the C atoms of diamine and dicarboxylic acid in this preferred embodiment must be at least 8, at least 9 or at least 10. Examples of suitable polyamides include: PA610 (which can be produced from hexamethylenediamine [6 C atoms] and sebacic acid [10 C atoms], the average number of C atoms in the monomer units therefore being 8), PA88 (produced from octamethylenediamine and 1,8-octanedioic acid), PA8 (which can be produced from caprylolactam), PA612, PA810, PA108, PA9, PA613, PA614, PA812, PA128, PA1010, PA10, PA814, PA148, PA1012, PA11, PA1014, PA1212 and PA12. Semiaromatic polyamides moreover have good suitability, for example PA66/6T, PA6/6T, PA6T/MPMDT (MPMD meaning 2-methylpentamethylenediamine), PA9T, PA10T, PA11T, PA12T, PA14T and copolycondensates of these latter types with an aliphatic diamine and with an aliphatic dicarboxylic acid or with an ω-aminocarboxylic acid or with a lactam. The production of the polyamides is prior art. It is also possible, of course, to use copolyamides based thereon, and it is also optionally possible here to make concomitant use of monomers such as caprolactam.

The polyamide may also be a polyetheresteramide or a polyetheramide. Polyetheramides are described in DE-A 30 06 961. They comprise a polyetherdiamine as comonomer. Suitable polyetherdiamines are obtained through conversion of the corresponding polyetherdiols by reductive amination or coupling to acrylonitrile with subsequent hydrogenation (e.g. EP-A-0 434 244; EP-A-0 296 852). Their number-average molecular weight may generally be from 230 to 4000; their polyetheramide content may be from 5 to 50% by weight.

Commercially available polyetherdiamines based on propylene glycol may be obtained commercially as Elastamin® grades from Huntsman. Other materials also having good suitability in principle include polyetherdiamines based on 1,4-butanediol or 1,3-butanediol, or mixed-structure polyetherdiamines, for example with random or with blockwise distribution of the units deriving from the diols.

It may also be possible to use mixtures of various polyamides, with the precondition of sufficient compatibility. Compatible polyamide combinations are known to the person skilled in the art or can be determined by routine experimentation.

One possible embodiment uses a mixture of from 30 to 99% by weight, more particularly from 40 to 98% by weight and with particular preference from 50 to 96% by weight, of polyamide in the narrow sense and from 1 to 70% by weight, particularly preferably from 2 to 60% by weight and with particular preference from 4 to 50% by weight, of polyetheresteramide and/or polyetheramide. Preference is given here to polyetheramides.

The polyamide moulding composition may be adhesion-modified in that it comprises additions which improve the adhesion to the metal surface. Examples of these additions include:

Oxazolines, e.g. 2-ethyl-2-oxazoline, 2-phenyl-2-oxazoline, 2-isopropenyl-2-oxazoline, 2-ethyl-4-methyl-2-oxazoline, 2-phenyl-4-ethyl-2-oxazoline, 2-phenyl-4-methyl-2-oxazoline. The oxazolines may be used alone or as mixture. The amounts used may be from 0.05 to 10% by weight, based on the polyamide moulding composition, and preferably from 0.1 to 5% by weight.

Bisoxazolines, e.g. 2,2'-methylenebis(2-oxazoline), 2,2'-ethylenebis(2-oxazoline), 2,2'-ethylenebis(4-methyl-2-oxazoline), 2,2'-propylenebis(2-oxazoline), 2,2'-tetramethylenebis(2-oxazoline), 2,2'-hexamethylenebis(2-oxazoline), 2,2'-octamethylenebis(2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-m-phenylenebis(4-methyl-2-oxazoline), 2,2'-o-phenylenebis(4-methyl-2-oxazoline), 2.2'-p-phenylenebis(4-phenyl-2-oxazoline), 2,2'-m-phenylenebis(4-phenyl-2-oxazoline), 2,2'-o-phenylenebis(4-phenyl-2-oxazoline), 2,2'-bis(2-oxazoline), 2,2'-bis(4-methyl-2-oxazoline), 2,2'-bis(4-ethyl-2-oxazoline), 2,2'-bis(4-phenyl-2-oxazoline). These bisoxazolines may be used alone or as mixture. The amounts used may be from 0.05 to 10% by weight, based on the polyamide moulding composition, and preferably from 0.1 to 5% by weight.

Polyoxazolines which may be produced by cationic ring-opening polymerization of oxazolines, such as the above-mentioned compounds. The amounts used may be from 0.05 to 10% by weight, based on the polyamide moulding composition, and preferably from 0.1 to 5% by weight.

Compounds having olefinic double bonds, for example polyalkenylenes; as described in German Patent Application 102012207173.3 of Apr. 30, 2012, the disclosure of which is incorporated herein by reference in its entirety.

Bifunctional epoxides, e.g. bisphenol diglycidyl ether or an epoxy resin having an epoxy functionality of at least 2. A wide variety of corresponding compounds may be obtained commercially. Here again, the amounts used may be from 0.05 to 10% by weight, based on the polyamide moulding composition, and preferably from 0.1 to 5% by weight.

Adhesive resins based on acetophenone-formaldehyde resins or cyclohexanone-formaldehyde resins. Here again, a wide variety of corresponding compounds are commercially available. The amounts used likewise may vary in the range from 0.05 to 10% by weight, based on the polyamide moulding composition, and preferably from 0.1 to 5% by weight.

Mono-, oligo- and polycarbodiimides; suitable compounds have the general formula

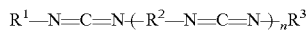

where $R^1$ and $R^3$ are each independently alkyl having from 1 to 20 C atoms, cycloalkyl having from 5 to 20 C-atoms, aryl having from 6 to 20 C atoms or aralkyl having from 7 to 20 C atoms, in each case optionally substituted with an isocyanate group optionally capped with a C—H—, a H— or O—H-reactive compound;
$R^2$ is alkylene having from 2 to 20 C atoms, cycloalkylene having from 5 to 20 C atoms, arylene having from 6 to 20 C atoms or aralkylene having from 7 to 20 C atoms;
n is from 0 to 100, preferably from 2 to 80 and particularly preferably from 3 to 70.

The oligo- or polycarbodiimide may be a homopolymer or a copolymer, for example a copolymer of 2,4-diisocyanato-1,3,5-triisopropylbenzene and 1,3-diisocyanato-3,4-diisopropylbenzene.

Suitable mono-, oligo- and polycarbodiimides are available commercially. Here again, the amounts used may be in the range from 0.05 to 10% by weight, based on the polyamide moulding composition, and preferably from 0.1 to 5% by weight.

The polyolefin may include polyethylene (PE) or polypropylene (PP). In principle it is possible to use any type that is available commercially: examples of those that may be used include linear high-, medium- or low-density polyethylene, LDPE, ethylene-acrylate copolymers, ethylene-vinyl acetate copolymers, isotactic or atactic homopolypropylene, random copolymers of propene with ethene and/or 1-butene, ethylene-propylene block copolymers and other similar polymers. The polyolefin may be produced by any known process, for example by the Ziegler-Natta process, by the Phillips process, by metallocenes catalysis or by a free-radical route.

The fluoropolymer may be a polyvinylidene fluoride (PVDF), an ethylene-tetrafluoroethylene copolymer (ETFE), an ETFE modified with the aid of a tercomponent such as propene, hexafluoropropene, vinyl fluoride or vinylidene fluoride (for example EFEP), an ethylene-chlorotrifluoroethylene copolymer (E-CTFE), a polychlorotrifluoroethylene (PCTFE), a tetrafluoroethylene-hexafluoropropene-vinylidene fluoride copolymer (THV), a tetrafluoroethylene-hexafluoropropene copolymer (FEP) or a tetrafluoroethylene-perfluoro(alkyl vinyl ether) copolymer (PFA). It may also be possible to use copolymers based on vinylidene fluoride which have up to 40% by weight of other monomers such as trifluoroethylene, chlorotrifluoroethylene, ethylene, propene and hexafluoropropene.

The polyarylene ether ketone comprises units of the formulae

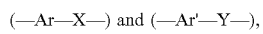

where Ar and Ar' represent a divalent aromatic moiety, preferably 1,4-phenylene, 4,4'-biphenylene or else 1,4-, 1,5- or 2,6-naphthylene. X is an electron-withdrawing group, preferably carbonyl or sulphonyl, while Y is another group such as O, S, $CH_2$, isopropylidene or the like. At least 50%, preferably at least 70% and particularly preferably at least 80%, of the groups X here are a carbonyl group, while at least 50%, preferably at least 70% and particularly preferably at least 80%, of the groups Y are composed of oxygen.

In one preferred embodiment, 100% of the groups X may be composed of carbonyl groups and 100% of the groups Y are composed of oxygen. In this embodiment the polyarylene ether ketone may be a polyether ether ketone (PEEK; formula I), a polyether ketone (PEK; formula II), a polyether ketone ketone (PEKK; formula III) or a polyether ether ketone ketone (PEEKK; formula IV), but other arrangements of the carbonyl groups and oxygen groups are naturally also possible.

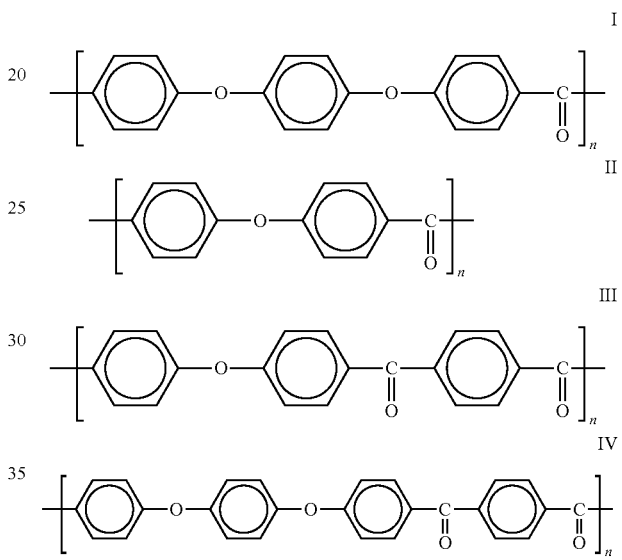

The polyarylene ether ketone is semicrystalline, and this is apparent by way of example in DSC analysis by the presence of a crystallite melting point $T_m$, which in most cases, in terms of order of magnitude, is around 300° C. or thereabove.

The polyphenylene sulphide comprises units of the formula

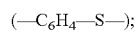

It may be preferable that it is composed of at least 50% by weight, at least 70% by weight or at least 90% by weight of said units. The remaining units may be those stated above in the case of the polyarylene ether ketone, or tri- or tetrafunctional branching-agent units which result from the concomitant use of, for example, trichlorobenzene or tetrachlorobenzene, during synthesis. Polyphenylene sulphide is available commercially in a wide variety of types or moulding compositions.

The moulding composition may comprise conventional auxiliaries and additives, and optionally further polymers, examples in the case of the polyarylene ether ketone being fluoropolymers such as PFA (a copolymer of tetrafluoroethene and perfluoro(vinyl methyl) ether), polyimide, polyetherimide, LCP such as liquid-crystalline polyester, polysulphone, polyether sulphone, polyphenyl sulphone, polybenzimidazole (PBI) or other polymers with high temperature resistance, and in the case of the polyphenylene sulphide by way of example copolymers and, respectively, terpolymers of ethylene with polar comonomers, and in the case of the polyamide an impact modifier. The usual additions can moreover be present, examples being plasticizers, pigments, fibrous reinforcement materials, processing aids and stabilizers. The proportion of polyarylene ether ketone, polyphenylene sulphide, polyamide, polyolefin or fluoropolymer in the moulding composition is at least 50% by weight, preferably at least 60% by weight, particularly preferably at least 70% by weight, with particular preference at least 80% by weight and very particularly preferably at least 90% by weight. It is preferable that the moulding composition comprises no second polymer component which forms a separate phase.

The inliner may have one layer, but can also be composed of two, three or more layers. The exterior layer of the inliner may be adhesion-modified, in order to achieve secure adhesive bonding to the carrier pipe: for example, the adhesive bonding of an inliner made of a polyolefin to the carrier pipe can be optimized in that the inliner is composed of an internal polyolefin layer and of an exterior layer which follows this and which is composed of a functionalized polyolefin. The functionalization may be achieved in a known manner by using an unsaturated compound which is grafted onto, or copolymerized with, the material and which for example comprises an anhydride group, a carboxy group or an epoxy group; examples including maleic anhydride, itaconic anhydride, acrylic acid, methacrylic acid and glycidyl methacrylate. An external layer of this type made of a functionalized polyolefin may also be used to optimize the adhesion of an inliners composed of a polyamide moulding composition.

In the case of multilayer inliners, layer sequences (from the inside to the outside) that are of particular interest include the following:
PE/PE-MSA (maleic-anhydride-functionalized PE);
PP/PP-MSA;
PA12/PE-MSA or PP-MSA;
PA11/PE-MSA or PP-MSA;
PA1010/PE-MSA or PP-MSA;
PA1212/PE-MSA or PP-MSA;
PA12/adhesion-modified PA12;
ETFE/ETFE-MSA;
PVDF/adhesion-modified PVDF, e.g. corresponding to EP 0 673 762 A2;
PEEK/PEEK modified with lamellar fillers; it is thus possible to reduce the coefficient of thermal expansion of the exterior layer of the inliner and to adapt same to be appropriate to that of the metal pipe, with resultant reduction of the shear stresses between polymeric inliner and metal pipe at higher operating temperatures or in the event of large temperature variations. Examples of suitable lamellar fillers are mica, talc powder, hexagonal boron nitride, lamellar graphite, molybdenum disulphide and phyllosilicate. It may be preferable that the moulding composition of the exterior layer comprises from 60 to 96 parts by weight of PEEK and from 4 to 40 parts by weight of lamellar filler, where the sum of these parts by weight is 100. In one particularly preferred embodiment, the moulding composition of the exterior layer comprises from 60 to 96 parts by weight of PEEK, from 2 to 25 parts by weight of hexagonal boron nitride and from 2 to 25 parts by weight of talc powder, where the sum of these parts by weight is 100.

The internal diameter of the carrier pipe is generally up to 2000 mm, preferably up to 1000 mm and particularly preferably up to 500 mm, the lower limit of internal diameter being 20 mm, preferably 30 mm and particularly preferably 40 mm. The wall thickness of the inliner is in the range from 1 to 100 mm, preferably in the range from 1.5 to 80 mm and particularly preferably in the range from 2 to 70 mm.

The inliner may preferably be produced by extrusion of a thermoplastic moulding composition to give continuous pipes; these are then cut to give appropriate sections. Multilayer inliners are correspondingly preferably produced by coextrusion.

The insertion of the inliner into the carrier pipe may be achieved by conventionally known methods such as described in the background section of the present specification.

The pipe is then heated from the outside, and any technically suitable process may be used here. For example, the carrier pipe may be heated by hot air, superheated steam, electromagnetic induction or IR sources. The temperature should preferably be at least 10 K, particularly preferably at least 20 K, with particular preference at least 30 K and very particularly preferably at least 40 K above the melting point of the material of the exterior surface of the inliner. The expression melting point means the crystallite melting point $T_m$ of the moulding composition, determined according to ISO 11357 in the 2nd heating procedure. If the inliner is composed of a PA12 moulding composition ($T_m$=178° C.), the temperature to which the carrier pipe should be heated is preferably at least about 190° C., particularly preferably at least about 200° C., with particular preference at least about 210° C. and very particularly preferably at least about 220° C. By analogy with this, if the inliner is composed of a PEEK moulding composition ($T_m$=335° C.), the temperature to which the carrier pipe should preferably be heated is at least about 350° C., particularly preferably at least about 360° C., with particular preference at least about 370° C. and very particularly preferably at least about 380° C. It is generally advisable to maintain the temperature for at least 10 s, preferably for at least 20 s, particularly preferably for at least 30 s and with particular preference for at least 40 s.

If the pipe is then heated to a temperature above the softening or melting range of the material of the exterior surface of the inliner, the external surface of the inliner melts and the contact pressure which is generated either by the reversal of deformation or by the thermal expansion of the inliner or by an internal pressure applied from the outside causes the melt to be forced into the microcavities between the inliner and the pipe. The annular space may thus be eliminated. Permeating gas can no longer accumulate, and no collapse of the inliner can then occur in the event that the pressure of the conveyed fluid varies. If adherent materials are suitably selected, the risk of collapse can be still further reduced: for example, it is conventionally known that PEEK adheres very well on metals. Good adhesion may also be achieved by the measures described above.

The temperature is then reduced. The cooling of the pipe may be achieved by natural means, preferably through an airlock and particularly preferably through water cooling. Cooling must be achieved at least to such an extent that the external surface of the inliner becomes solid again. Cooling is usually carried out to ambient temperature.

After the cooling process, a long-lasting internocular effect prevails between the inliner material and the pipe material, optionally together with adhesive bonding. Relative movements between inliner and carrier pipe are thus also prevented.

By virtue of high mechanical strength, of good abrasion properties, of good scratch resistance and also of the optimized thickness of the inserted inliner, it may be possible according to the invention simultaneously to ensure not only good protection from corrosion but also good protection from abrasion. The very smooth internal surface of the polymeric inliner moreover ensures very low flow resistance, and this reduces the energy required for the conveying process (in particular the power used for pumping); at the same time, it ensures that the extent of deposits or contamination on the internal wall, for example due to waxes, salts or biocoatings, is reduced. At the same time, the process of the invention eliminates the risk of collapsing the inliner in the event of pressure variations. For this reason, the pipeline produced from the pipes of the invention may be used particularly advantageously for the conveying or transport of crude oil or natural gas or for the transport of supercritical $CO_2$, especially under conditions where relatively rapid pressure changes are likely.

Numerous modifications and variations on the present invention are possible in light of the above description. It is therefore to be understood that within the scope of the following Claims, the invention may be practiced otherwise than as specifically described herein. Any such embodiments are intended to be within the scope of the present invention.

The invention claimed is:

1. A process for producing a pipe, comprising:
   introducing a thermoplastic inliner into a carrier pipe, the carrier pipe comprising an interior surface that has a shape and an exterior surface;
   heating the exterior surface of the carrier pipe from the outside of the carrier pipe to a heating temperature higher than a crystallite melting point ($T_m$) of a moulding composition of an exterior surface of the inliner;
   transferring the heat from the interior surface of the carrier pipe to the exterior surface of the inliner;
   expanding the inliner radially in the carrier pipe so that the heated exterior surface of the inliner assumes the shape of the interior surface of the carrier pipe;
   water cooling the inliner, thereby obtaining pipe comprising the carrier pipe and the thermoplastic inliner;
   wherein
   an external diameter of the inliner is at most 25% greater than an internal diameter of the carrier pipe, and
   the cross section of the inliner is reduced by from 3 to 30%
   the interior surface of the carrier pipe is a metal selected from the group consisting of steel, zinc and an alloy comprising aluminium, iron or zinc, and
   the cross section of the inliner is reduced through exposure to an exterior force prior to being introduced into the carrier pipe.

2. The process according to claim 1, wherein
   an external diameter of the inliner corresponds to the internal diameter of the carrier pipe or is smaller by no more than 3%.

3. The process according to claim 1, wherein
   the inliner comprises at least one layer.

4. The process according to claim 1, wherein
   the inliner comprises at least two layers and
   an exterior layer of the inliner is adhesion-modified.

5. The process according to claim 1, wherein the thermoplastic inliner is made from at least one thermoplastic moulding composition selected from the group consisting of a polyamide, a polyolefin, a fluoropolymer, a polyarylene ether ketone, and a polyphenylene sulphide.

6. The process according to claim 1, wherein the heating is maintained at the heating temperature for at least 10 seconds.

7. The process according to claim 4, wherein the exterior layer of the inliner comprises a functionalized thermoplastic moulding composition.

* * * * *